United States Patent
Rajan et al.

(10) Patent No.: US 11,016,974 B2
(45) Date of Patent: May 25, 2021

(54) PROGRAM SYNTHESIS FOR QUERY OPTIMIZATION

(71) Applicant: Microsoft Technology Licensing, LLC, Redmond, WA (US)

(72) Inventors: Kaushik Rajan, Bangalore (IN); Akash Lal, Bangalore (IN); Matthias Schlaipfer, Wien (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 685 days.

(21) Appl. No.: 15/851,746

(22) Filed: Dec. 22, 2017

(65) Prior Publication Data
US 2019/0197161 A1   Jun. 27, 2019

(51) Int. Cl.
*G06F 16/2453* (2019.01)

(52) U.S. Cl.
CPC .. *G06F 16/24542* (2019.01); *G06F 16/24535* (2019.01)

(58) Field of Classification Search
CPC .............. G06F 16/24542; G06F 16/24535
See application file for complete search history.

(56) References Cited

U.S. PATENT DOCUMENTS

| | | | | |
|---|---|---|---|---|
| 6,748,374 B1* | 6/2004 | Madan | ............... | G06F 16/2452 |
| 7,730,079 B2* | 6/2010 | Meijer | ............... | G06F 16/332 707/760 |
| 7,801,913 B2* | 9/2010 | Shrivastava | ........ | G06F 16/2452 707/779 |
| 10,261,956 B2* | 4/2019 | Jugel | .............. | G06F 16/24535 |
| 2007/0055661 A1* | 3/2007 | Witkowski | ............. | G06F 16/24 |
| 2009/0132474 A1* | 5/2009 | Ma | ..................... | G06F 16/24535 |
| 2010/0030733 A1* | 2/2010 | Draughn, Jr. | ..... | G06F 16/24535 707/713 |
| 2011/0022583 A1* | 1/2011 | Pennell, Sr. | ...... | G06F 16/24542 707/718 |
| 2014/0025694 A1* | 1/2014 | Ryman | .................. | G06F 16/258 707/756 |
| 2015/0095312 A1* | 4/2015 | Gulwani | .............. | G06F 16/2282 707/722 |
| 2015/0379082 A1* | 12/2015 | Hu | ....................... | G06F 16/2452 707/718 |
| 2016/0140173 A1* | 5/2016 | Kumar | .................. | G06F 16/951 707/706 |
| 2017/0364539 A1* | 12/2017 | Jacob | ..................... | G06F 16/213 |
| 2017/0364694 A1* | 12/2017 | Jacob | ................ | G06F 16/24534 |
| 2019/0065567 A1* | 2/2019 | Griffith | .................... | G06F 16/25 |

* cited by examiner

*Primary Examiner* — Matthew J Ellis
(74) *Attorney, Agent, or Firm* — Schwegman Lundberg & Woessner, P.A.

(57) ABSTRACT

Systems, methods, and computer-executable instructions for using program synthesis for a database query includes analyzing a database query, written in a first language, to identify a first sub-query. A first synthesis template is constructed for the first sub-query. A first program, synthesized in a second language different from the first language, is synthesized using the first synthesis template. The functionality of the first program is equivalent to the first sub-query. The database query is rewritten to call the first program. The rewritten database query is executed.

15 Claims, 14 Drawing Sheets

$$\frac{Q = r \quad r : \text{table}}{\emptyset \vdash \text{gw}(\text{cols}(r), Q)} \text{ INIT 302}$$

$$\frac{\Gamma \vdash \text{gw}(A, Q)}{\Gamma \cup \{B' \mapsto \Gamma(B)\} \vdash \text{gw}(A, \rho_{B \mapsto B'}(Q))} \text{ RENAME 304}$$

$$\frac{\Gamma \vdash \text{gw}(A, Q)}{\Gamma \vdash \text{gw}(A, \sigma_\varphi(Q))} \text{ SELECT 306}$$

$$\frac{\Gamma \vdash \text{gw}(A_1, Q)}{\Gamma|_{A_2} \vdash \text{gw}(A_1, \pi_{A_2}(Q))} \text{ PROJECT 308}$$

$$\frac{\Gamma_1 \vdash \text{gw}(A_1, Q_1) \quad \Gamma_2 \vdash \text{gw}(A_2, Q_2) \quad \Gamma = \Gamma_1 \cup \Gamma_2 \quad \Gamma(\varphi) = \bigwedge_i^n a_i = a_i \wedge \psi \quad A_1 \cap A_2 \cap \{a_1, \ldots, a_n\} \neq \emptyset}{\Gamma \vdash \text{gw}(A_1 \cap A_2 \cap \{a_1, \ldots, a_n\}, Q_1 \bowtie_\varphi Q_2)} \text{ JOIN 310}$$

$$\frac{\Gamma \vdash \text{gw}(A_1, Q) \quad A_1 \cap \Gamma(A_2) \neq \emptyset}{\Gamma \vdash \text{gw}(A_1 \cap \Gamma(A_2), \gamma_{A_2, F(B)}(Q))} \text{ GROUPBY 312}$$

$$\frac{\Gamma_1 \vdash \text{gw}(A_1, Q_1) \quad \Gamma_2 \vdash \text{gw}(A_2, Q_2)}{\Gamma_1 \cup \Gamma_2 \vdash \text{gw}(A_1 \cap A_2, Q_1 :: Q_2)} \text{ UNION 314}$$

*FIG. 3*

```
PROC UDO2_MERGEDU(A, LIST ROWS)
    // ASSUMES SORTED([C], ROWS)
    FIRST ← TRUE
    FOREACH (C,M1,M2) ∈ ROWS
        IF FIRST
            SUM1 ← 0; CNT1 ← 0;                    — 502
            SUM2 ← 0; CNT2 ← 0;                    — 504
            OLDC ← C; FIRST ← FALSE;
        IF OLDC == C
            SUM1 ← SUM1 + M1
            SUM2 ← SUM2 + M2
        ELSE
            IF (SUM1 > 100) CNT1++
            IF (SUM2 > 100) CNT2++
            SUM1 ← M1; SUM2 ← M2;
        OLDC ← C;
    IF (SUM1 > 100) CNT1++
    IF (SUM2 > 100) CNT2++
    IF CNT1 > 0
        OUTPUT(A, CNT1)
    IF CNT2 > 0
        OUTPUT(A, CNT2)
```

(A) UNION: OUT1 ::: OUT2

*FIG. 5A*

```
PROC UDO2_MERGEDJ(A, LIST ROWS)
  // ASSUMES SORTED([C], ROWS)
  FIRST ← TRUE
  FOREACH (C,M1,M2) ∈ ROWS
    IF FIRST
      SUM1 ← 0; CNT1 ← 0;                    ← 512
      SUM2 ← 0; CNT2 ← 0;                    ← 514
      OLDC ← C; FIRST ← FALSE;
    IF OLDC == C
      SUM1 ← SUM1 + M1
      SUM2 ← SUM2 + M2
    ELSE
      IF (SUM1 > 100) CNT1++;
      IF (SUM2 > 100) CNT2++;
      SUM1 ← M1; SUM2 ← M2;
    OLDC ← C;
  IF (SUM1 > 100) CNT1++;
  IF (SUM2 > 100) CNT2++;
  IF CNT1 > 0 ∧ CNT2 > 0
    OUTPUT(A, CNT1, CNT2)
```

(B) JOIN: OUT1 ⋈φα OUT2

FIG. 5B

|  | Spark | | Scope | | sub-query operators |
|---|---|---|---|---|---|
|  | stages | sub-query | stages | sub-query |  |
| Q1 | 6 | 6 | 10 | 8 | 1 $\gamma$, 2 $\bowtie$ |
| Q2 | 16 | 16 | 13 | 13 | 5 $\gamma$, 4 $\cup$ |
| Q3 | 8 | 6 | 10 | 7 | 2 $\gamma$, 1 $\bowtie$ |
| Q4 | 12 | 9 | 9 | 8 | 4 $\gamma$, 2 $\cup$ |
| Q5 | 16 | 16 | 7 | 7 | 5 $\gamma$, 4 $\bowtie$ |
| Q6 | 5 | 3 | 4 | 3 | 2 $\gamma$ |
| Q7 | 10 | 8 | 12 | 9 | 3 $\gamma$, 2 $\bowtie$ |
| Q8 | 7 | 7 | 8 | 8 | 4 $\gamma$, 2 $\cup$ |
| Q9 | 15 | 15 | 12 | 12 | 7 $\gamma$, 6 $\bowtie$ |
| Q10 | 11 | 9 | 20 | 18 | 8 $\gamma$, 7 $\cup$ |
| Q11 | 4 | 2 | 11 | 9 | 3 $\gamma$, 2 $\cup$ |
| Q12 | 9 | 7 | 14 | 11 | 2 $\gamma$, 2 $\bowtie$ |
| Q13 | 5 | 5 | 7 | 7 | 2 $\gamma$, 1 $\bowtie$ |
| Q14 | 6 | 4 | 5 | 4 | 1 $\gamma$, 2 $\cup$ |
| Q15 | 4 | 2 | 11 | 9 | 1 $\gamma$, 1 $\bowtie$ |
| Q16 | 4 | 2 | 4 | 2 | 1 $\gamma$, 1 $\bowtie$ |
| Q17 | 6 | 4 | 5 | 4 | 2 $\gamma$, 1 $\bowtie$ |
| Q18 | 5 | 4 | 9 | 7 | 1 $\gamma$, 1 $\bowtie$ |
| Q19 | 5 | 3 | 4 | 3 | 2 $\gamma$, 1 $\bowtie$ |

FIG. 8

|     | Synth. time(s) | Simpl. anal. | UDO complexity | | Sort cols | LOC |
| --- | --- | --- | --- | --- | --- | --- |
|     | 1002 | 1004 | time | space | | |
| Q1  | 516 | t | 1 loop | constant (~5) | 1 | 20 |
| Q2  | 221 | s,t,r | 1 loop | constant (~30) | 1 | 60 |
| Q3  | 44 | s,r | 2 loops | linear (n+~20) | 2 | 60 |
| Q4  | 460 | s,r | 1 loop | constant (~10) | 2 | 50 |
| Q5  | 79 | s | 1 loop | constant (~20) | 1 | 50 |
| Q6  | 30 | r,t | 2 loops | linear (n+~10) | 0 | 20 |
| Q7  | 18 | s | 2 loops | linear (n+~10) | 1 | 50 |
| Q8  | 2 | s | 1 loop | constant (~10) | 1 | 50 |
| Q9  | 2 | s,t | 1 loop | constant (~20) | 1 | 80 |
| Q10 | 3 | s | 1 loop | constant (~20) | 0 | 80 |
| Q11 | 3 | s,t | 2 loops | linear (n+~20) | 0 | 90 |
| Q12 | 14 | s | 2 loops | linear (n+~10) | 1 | 40 |
| Q13 | 330 | - | 2 loops | linear (n+~10) | 2 | 40 |
| Q14 | 1 | s | 1 loop | constant (~10) | 0 | 30 |
| Q15 | 2 | - | 1 loop | constant (~10) | 1 | 10 |
| Q16 | 5 | s | 1 loop | constant (~10) | 1 | 10 |
| Q17 | 13 | s | 2 loops | linear (n+~20) | 1 | 60 |
| Q18 | 1 | t | 1 loop | constant (~5) | 1 | 50 |
| Q19 | 31 | r | 1 loop | constant(~10) | 0 | 40 |

FIG. 10

PROGRAM SYNTHESIS FOR QUERY OPTIMIZATION

BACKGROUND

Storage systems, distributed computing frameworks, big data systems, etc. store massive amounts of data. These storage systems provide a framework for big data analysis. Queries may be used to access and analyze the data within these storage systems. Querying stored data from the storage system may take a long time. A common query language is the structured query language (SQL). SQL queries may be optimized in an attempt for the query to be more efficient in resource use and time to completion. One query optimization technique relies on a predefined set of rewrite rules to re-order and substitute query operators at a logical level.

BRIEF DESCRIPTION OF THE DRAWINGS

FIG. 3 illustrates a groupwise query analysis in accordance with respective examples.

FIG. 5A shows the merged UDO that combines UDOs of Out1 and Out2 of Query2 of Table 3 in accordance with respective examples.

FIG. 5B shows the merged UDO that of a join in accordance with respective examples.

FIG. 8 shows benchmark queries along with the number of stages, sub-queries, and operators in accordance with respective examples.

FIG. 10 shows results from running the synthesis engine over various example queries in accordance with respective examples.

DETAILED DESCRIPTION

Figure 1:
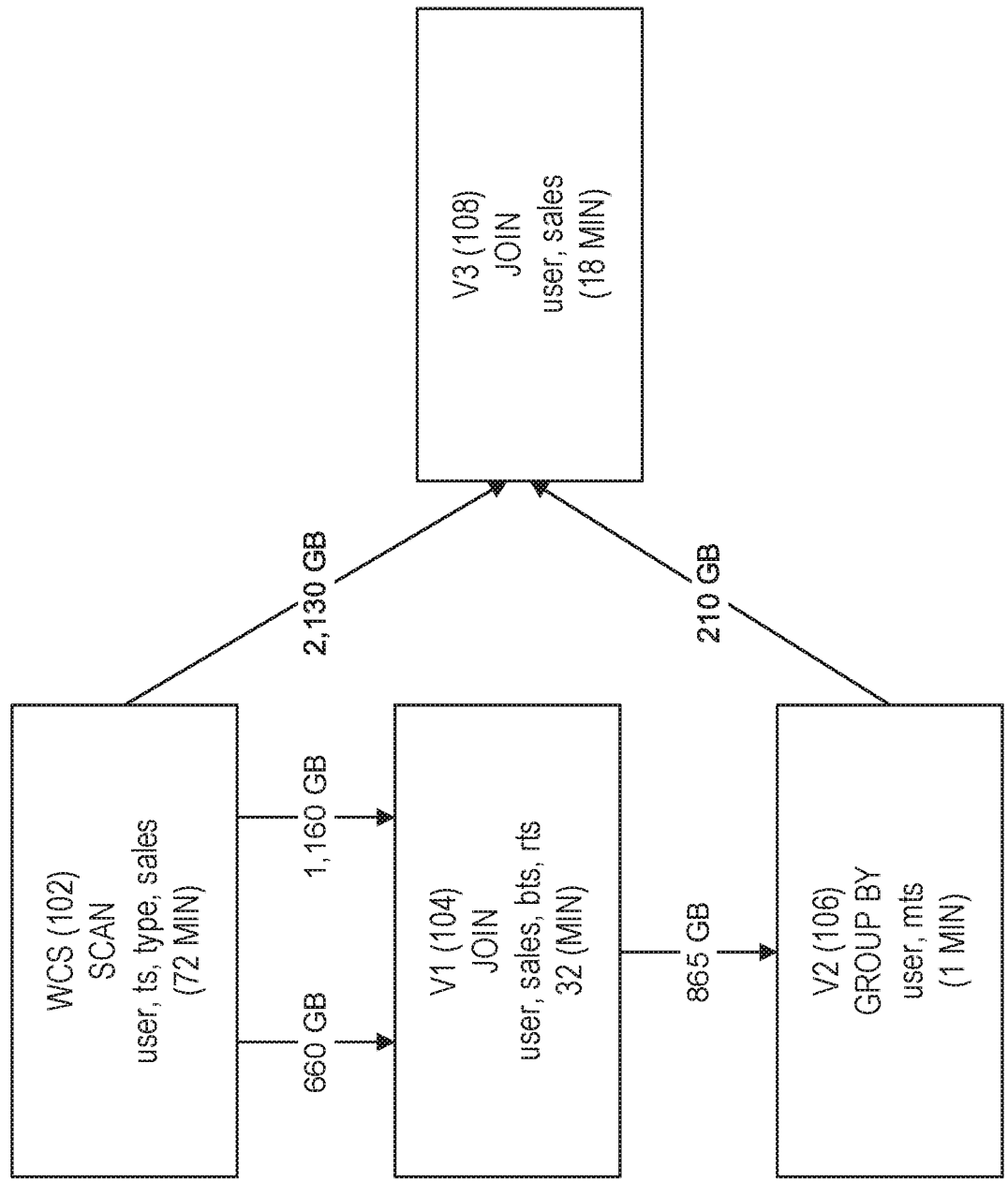
FIG. 1 illustrates an execution plan for a BigBench8 query.

Current re-write based query optimization relies on a predefined set of rewrite rules to re-order and substitute query operators within a query. One current way queries are optimized is to compile a query into an execution plan that consists of a directed acyclic graph (DAG) of MapReduce-like stages. The query compilation may happen in three phases. First, operators are transformed and reordered at the logical level. For example, SQL operators may be substituted with other equivalent SQL operators and filtering operators are pushed up closer to the source of the data. Next, efficient physical implementations are chosen for each operator. Typical SQL operators lend to highly-optimized low-complexity implementations. Finally, operators are grouped together into stages if the composition continues to have low complexity. The generated plan is then executed on a distributed system such that each stage may run in parallel. The data between stages may be exchanged over a network.

Analyzing the query optimization using predefined rewrite rules, various trends emerged. Many of the plans, represented as a DAG of stages, had a single stage that dominated significant parts of the query. In other words, the number of stages whose input is functionally dependent on the output of a single stage is high. In addition, in the final data that is produced by the dominated sub-query, each row depends on only a subset of the rows of the output of the dominating stage. Thus, even the optimized query may be optimized further by using a different approach. Rather than using a predefined set of rules, program synthesis may be used to generate an optimized query that does not rely on a predefined set of rewrite rules. Program synthesis may use all or portions of the original query. Program synthesis allow custom user-defined operations to make queries more efficient, saving processing, memory, and networking resources, which may not be possible using a predefined set of rules.

The above trends imply a possible query transformation may be used to replace a large sub-query. This may be done using a mapper that identifies the right group of rows and a reducer that applies a function to each group to produce the correct output. Such an optimization may have significant benefits because it reduces the number of stages, thus decreasing the amount of data that needs to be transmitted over a network. However, the reducer function should be efficient to process each mapped group on a single machine.

Disclosed herein are embodiments that employ automated program reasoning to synthesize low complexity operators. Groupwise analysis may be extended to a formal static analysis that identifies sub-queries. Program synthesis may then be used to construct an efficient operator that may have linear time and space complexity.

Program synthesis is the problem of constructing executable code given its input-output specification. The specification comes from the semantics of the original query and the linear-time operator (modulo sorting) is the desired output. Program synthesis may be computationally very demanding. Often, program synthesis is limited to very simple or very small synthesis tasks. Using program synthesis without modification may be insufficient to optimize many queries. To overcome this, several auxiliary analyses may be used that impose restrictions on the structure of the synthesized code. This may reduce the search space of possible implementations, while still allowing feasible solutions for most queries that are to be optimized. The auxiliary analyses, therefore, allow a program to be synthesized in a manner allowing the program to be used in query optimization.

To simplify program synthesis, the high-level structure of an operator may be fixed by bounding the kinds of loops, branching and control flow that the operator may have. In addition, the amount of local state that the operator may use may be bounded. The query may be analyzed to extract expressions, predicates and aggregation functions that will likely be reused in the operator. This information may then be used to generate a partial program, i.e., a program with holes. Next, program synthesis is used to fill these holes with code such that the resulting program synthesized operator matches the semantics of the input query.

One possible limitation of the program synthesis is that the program synthesized operation may only have partial soundness. Current synthesis tools are able to guarantee that the synthesized implementation meets the specification only up to a fixed bound on the size of the input. To account for this, the synthesized operator may be translated back to the source language as a query with user-defined operators (UDOs). The translated operation may then be validated.

The described program synthesis was tested over various examples. On average, queries attained a speedup of 2×, had 65% fewer stages, required less than half the cumulative CPU time, and transferred up to 75% less data across the network compared to the original query. In addition, various known standard benchmark suites were used for evaluation.

Table 1 below illustrates a simplified version of the BigBench8 query from the TPCx-BigBench benchmark.

TABLE 1

```
VIEW  V1 =
    SELECT s1.user ,
        s1.sales, s1.ts AS bts ,
        s2.ts AS rts
    FROM wcs AS s1 JOIN wcs AS s2
    ON s1.user = s2.user
    WHERE s1.type = "buy"
    AND s2.type = "review"
    AND s1.ts > s2.ts;
VIEW  V2 =
    SELECT user, rts, MIN ( bts ) AS mts
    FROM V1
    GROUP BY rts, user ;
VIEW V3 =
    SELECT ar. user, ar.sales
    FROM wcs AS ar SEMI JOIN V2 AS bia
    ON ar.bts = bia.mts
    AND ar.user = bia.user;
```

FIG. 1 illustrates an execution plan for an example BigBench8 query. The query aims to find buys where the customer checked online reviews just before making the purchase. The BigBench8 query operates over data representing a web-click stream with 4 fields: wcs(ts:int, user:int, type:string, sales:int). The column is is the (unique) timestamp of the web click. Column user identifies the user, column type represents the transaction type ("buy" or "review"), and column sales is the sales amount associated with the click. View V1 104 selects all buys after reviews using a self-join on the wcs table, view V2 106 finds the smallest purchase timestamp and view V3 106 discards all rows except ones with this least timestamp.

The execution plan includes four stages 102, 104, 106, and 108. The stages 102, 104, 106, and 108 correspond with the different views from the SQL shown in Table 1. The stage 102 is a scan of the entire users table. FIG. 1 also includes runtime statistics for each stage. All the stages in the plan are dominated by the top-most stage 102. The query plan is quite inefficient. It performs two expensive joins stages 104 and 108 and shuffles data redundantly between stages. As a result, a large amount of time is spent in the dominated stage 102.

The query may be optimized using user-defined operations. The final output for a user can only be influenced by the rows of the same user in the input wcs table. Accordingly, partitioning the input on the user column, processing each partition independently and then putting the results back together may be more efficient than the execution plan in FIG. 1. Such kinds of queries, which can be partitioned on a column and processed independently are called groupwise queries. Groupwise analysis may be used to find maximal sub-queries that serve as candidates for optimization. In this example, the entire query is considered for optimization.

Using a groupwise operation by itself, however, may not create a more efficient query. An execution plan that uses groupwise analysis may replace the multiple simple stages from FIG. 1 with a single stage, but that stage will have higher time and space complexity than any of the original stages. Accordingly, without using a UDO a groupwise optimized query may run out of memory or end up not being an optimization and instead, run slower than the original execution plan from FIG. 1. In the disclosed embodiments, an UDO may be used to produce an equivalent query for the original query.

Figure 2:
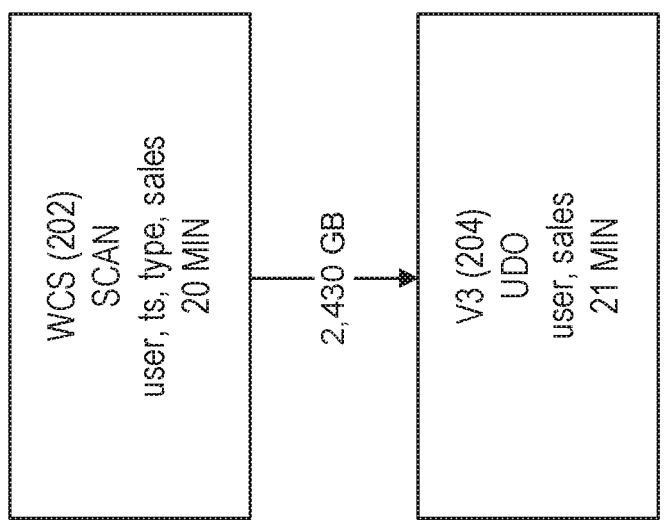
FIG. 2 illustrates an optimized query for the BigBench8 query in accordance with respective examples.

FIG. 2 illustrates an optimized query for the BigBench8 query in accordance with respective examples. The execution plan includes only two stages 202 and 204. The first stage 202 is a scan of the wcs table, while the second stage 204 includes a user-defined operator (UDO). The user-defined operation corresponds to the udo shown in Table 2 below.

TABLE 2

```
TRANSFORM wcs
PARTITIONED BY user
SORTED BY ts
USING udo
proc udo(user, List rows)
    // assumes sorted([ts], rows)
    Flag ← False
    foreach row ∈ rows
        if flag  row.type == "buy"
            output(row)
            flag ← False
        if row.type == "review"
            flag ← True
```

In FIG. 2, an optimization of the query partitions the input on the user column and executes the query on each partition independently. As described in greater detail below, the UDO is a synthesized program that is equivalent to the original query from Table 1.

The query optimizer automatically determines to partition on the user column, sort each partition on is (timestamp) and execute the UDO shown in Table 2 to obtain the same output as the original query from Table 1. The UDO has linear time complexity and requires a constant amount of additional storage, e.g., the flag variable. In some examples, the UDO may even be executed in a streaming fashion because it requires a single pass over the input, offering further benefits and parallelization opportunities. In this example, the optimized query was 3× faster than the original query. In addition, the optimized query also used much fewer resources; transferred less data and completed execution with fewer tasks. Finally, the synthesized query was simpler to understand than the original query. The UDO is determined based upon the original query. A rule based approach does not use the original query. Accordingly, the UDO may realize optimizations that are not available to a rule based optimization approach.

Tables 4 and 5 below illustrates an example from a real-world query from a data center. Table 4 shows the complete, unoptimized query. Table 5 shows an optimized sub-query of the original query for determining Out1 using a synthesized UDO.

TABLE 4

```
VIEW V =
    SELECT a, b, c,
        SUM ( m1 ) AS m1, SUM ( m2 ) AS m2, SUM ( m3 ) AS m3,
SUM ( m4 ) AS m4, SUM ( m5 ) AS m5, SUM ( m6 ) AS m6
        FROM Input
        GROUP BY a, b, c;
```

TABLE 4-continued

```
VIEW Out1 =
    SELECT a, b, COUNT ( DISTINCT c) AS c
    FROM V
    WHERE m1 > 100 GROUP BY a, b;
VIEW Out2 =
    SELECT a, b, COUNT ( DISTINCT c) AS c
    FROM V
    WHERE m2 > 100
    GROUP BY a, b;
VIEW Out3 =
    SELECT a, b, COUNT ( DISTINCT c) AS c
    FROM V
    WHERE m3 > 100
    GROUP BY a, b;
VIEW Out4 =
    SELECT a, b, COUNT ( DISTINCT c) AS c
    FROM V
    WHERE m4 > 100 GROUP BY a, b;
VIEW Out5 =
    SELECT a, b, COUNT ( DISTINCT c) AS c
    FROM V
    WHERE m5 > 100 GROUP BY a, b;
VIEW Final =
    Out1 UNION Out2 UNION
    Out3 UNION Out4 UNION Out5;
```

TABLE 5

```
VIEW V =
    SELECT a, b, c, SUM(m1) AS m1,
    FROM Input
    GROUP BY a, c;
VIEW Out1 =
    SELECT a, COUNT (DISTINCT c) AS c
    FROM V
    WHERE m1 > 100 GROUP BY a;
TRANSFORM Input
PARTITIONED BY a
SORTED BY c
USING udo2
proc udo2(a, List rows)
// assumes sorted([c], rows)
First ← True
foreach (c, m1) ∈ rows
    if first
        sum1 ← 0;
        cnt1 ← 0;
        oldC ← c;
        first ← False;
    if oldC == c
        sum1 ← sum1 + m1
    else
        if (sum1 > 100) cnt1++;
        sum1 ← m1;
        oldC ← c;
if (sum1 > 100) cnt1++;
if cnt1 > 0
    output(a,cnt1)
```

The query in Table 4 is groupwise on columns a and b. A direct application of program synthesis for the entire query, however, may not scale. Accordingly, in some examples, the query is analyzed to determine sub-queries. Each sub-query may then be optimized independently of other sub-queries. The results of the sub-queries may then be combined per the original query. For example, the query may be analyzed to determine that the query contains a union operator that puts together the results from each of its inputs. This is seen as the last view, Final, in Table 4. In an example, the synthesis engine may attempt to synthesize separate UDOs that produce tables Out1 to Out5 and then put the operators together in a rule-based fashion. For instance, an UDO may extract a smaller query that computes Out1 and synthesizes an operator for it, as shown in Table 5 as udo2. The synthesis engine may attempt this strategy for N-ary operators whenever the synthesis engine determines that the N individual UDOs may be put together safely while preserving semantics and maintaining low UDO complexity.

The synthesis engine, may further simplify a query by doing a taint analysis of each of the sub-queries that compute Out1 to Out5. The taint analysis allows the input and intermediate columns that are unnecessary for a sub-query to be eliminated. In addition, redundant columns may also be eliminated. The results of this analysis are seen in Table 5 with column b and the m2-m6 calculated columns eliminated. Each of the columns m2 to m6 are irrelevant for Out1. Further, columns a and b always appear together, hence, these two columns may be condensed into the same column. Accordingly, these columns may be removed prior to the synthesis of udo2. Removing the columns simplifies the subquery, making the program synthesis easier.

After the taint analysis, a template for the UDO is constructed. A template is a partial program, e.g., a program with holes. The synthesis engine fills the holes with code that creates a UDO that generates the same output as the replaced portion of the query. Fewer holes allows for better scalability but a smaller set of possible implementations. The template is constructed to restrict attention to linear-time operators that may only do a fixed number of passes over the input. In some examples, the input is pre-sorted as sorting may drastically reduce the complexity of the synthesized UDO. If the synthesis engine finds that sorting is useful, sorting may be pushed into the previous stage before the UDO is called. Further, the synthesis engine may restrict the form of predicates and expressions in the template. For example, the predicates and expressions may appear in the original input query, or may do a simple manipulation of a finite number of flags and memoization variables The synthesized UDO corresponding to the Out1 view from the original query is shown in Table 5 as the procedure udo2. The UDO udo2 uses a sorted column c and the cnt1 aggregate for simulating "COUNT(DISTINCT c)". In an example, the synthesis took five minutes to finish, and the optimized query ran 4× faster than the original query.

In various examples, the program synthesis engine uses a SQL-like input language to represent queries. This language defines common operators such as select, join, group-by, etc. A table may be represented as a list of records, where a record may be in the form of h={$a_1$: $v_1$, . . . , $a_n$:$v_n$}. A value $v_i$ in a record h at column $a_i$ may be represented as h.$a_i$. In an example, values may be either integers or rationals, e.g., pairs of integers. In other examples, values may also be characters, strings, boolean, etc. Two records are considered equivalent if the records contain the same columns and all corresponding values are equal. To access the columns of record cols(h)={$a_1$, . . . , $a_n$} may be used.

In addition, various operators akin to SQL equivalents that operate on tables: selection, projection, renaming of columns, join, union and group-by, are also implemented and supported. In an example, one difference from SQL is that each operator imposes an order on the output records relative to the order in the input.

The semantics of the operators is standard. Selection ($\sigma_\varphi$) takes a predicate φ and uses the predicate to filter the input. Projection ($\pi_A$) limits the output to the columns in A without removing duplicates. Union (:::) appends one list to another list without removing duplicates. Inner join ($\bowtie_\varphi$) takes two lists and iterates over all pairs of rows. The output of an inner join is the concatenated pair subject to the filter predicate φ. Rename (ρA→A') renames the columns in A to A' and leaves the remaining ones unchanged. The rename operator may be used to avoid clashes between column names of different tables. Group-by ($\gamma$A, FB) takes a set of grouping columns A, and a set of aggregation functions over the aggregation columns B. The group-by operator partitions the input on all distinct values that appear in columns A, and for each partition it computes the aggregation and concatenates it with the partition value. Example aggregations include, but are not limited to, sum, count, minimum, maximum, mean, average, etc.

A query Q may be represented as a composition of these operators applied to a single input table. While the examples discussed consider single-input and single-output queries, the described techniques may be generalized to multi-input and multi-output queries. Queries may be written in a view form as a sequence of assignments that each apply a single operator, e.g., $v_i = op(v_j)$ or $v_i = op(v_j, v_k)$, with i>j, i>k, op $\in$ $\{\sigma, \pi, :::, \bowtie, \gamma, \rho\}$. Such a query maps input table $v_0$ to the output table $v_{max}$, where $v_{max}$ is the last variable assigned in the sequence of assignments. Table 6 illustrates some examples between SQL and the language used in the synthesis engine.

TABLE 6

| SQL | Synthesis Engine Language |
| --- | --- |
| VIEW v = <QUERY> | $\stackrel{def}{=}$ v = Q |
| SELECT * FROM r; | $\stackrel{def}{=}$ r |
| SELECT * FROM r WHERE phi; | $\stackrel{def}{=}$ $\sigma_{phi}(r)$ |
| SELECT A FROM r; | $\stackrel{def}{=}$ $\pi_A(r)$ |
| SELECT * FROM r1 UNION r2; | $\stackrel{def}{=}$ $r_1:::r_2$ |
| SELECT * FROM r1 JOIN r2 ON phi; | $\stackrel{def}{=}$ $r_1 \bowtie_{phi} r_2$ |
| SELECT * FROM r AS r1 | $\stackrel{def}{=}$ $\rho_{cols(r) \to r1.cols(r)}(r)$ |
| SELECT A, F(B) FROM r GROUP BY A HAVING phi | $\stackrel{def}{=}$ $\sigma_{phi}(\gamma A, FB(r))$ |
| SELECT A AS Aprime FROM r; | $\stackrel{def}{=}$ $\rho_{A \to A'}(r)$ |

Some SQL queries may not directly translate into the synthesis engine language. These SQL queries, however, may be rewritten to fit into the synthesis engine language. For instance, SELECT DISTINCT A FROM r may be rewritten to SELECT A FROM r GROUP BY A.

While in various examples, the ordering of rows in a table is used (e.g., sorting may be done to reduce runtime complexity), the synthesis engine views a table as a multiset in line with standard SQL semantics. Thus, two queries Q1 and Q2 are equivalent, if given the same input they produce the same output up to a reordering of rows.

Consider the query in Table 1. Each view contains either an equijoin or a group-by on the user column. Hence, the query may be executed by partitioning wcs on the user column. The query may then be executed on each partition. The partial results may then be combined using a union. Such queries, where partitions of the input may be considered in isolation are called groupwise queries. The processing required on each partition may be referred to as the partial query. The partial query may be the original query itself, or a simplified version since each partition carries a unique value for the partitioning columns.

FIG. 3 illustrates a groupwise query analysis in accordance with respective examples. FIG. 3 illustrates a number of inference rules that may be used to determine if a query is groupwise and if so, then on what columns. The notation $\Gamma \vdash gw(A, Q)$ means that the query Q is groupwise on columns A of its input table and $\Gamma$ is a set of column renamings that map columns of the output table to columns of its input table. Tracking renamings is important because the set of partitioning columns of a groupwise query must refer to its input table.

Rule Init 302 says that the identity query (which simply returns the input table) is groupwise on all columns of the table. Renaming (Rename 304) does not change the groupwise nature of a query but keeps the fact that B' are aliases of columns $\Gamma(B)$ of the input table. Selection (Select 306) and projection (Project 308) do not change the groupwise nature of a query either. In Project 308, the notation $\Gamma|A2$ means that all mappings on columns other than A2 are dropped. For a join 310 $Q_1 \bowtie_\varphi Q_2$, the join predicate $\varphi$ is examined to identify the equi-join columns ($\{a_1, \ldots, a_n\}$) and take an intersection with the groupwise columns of $Q_1$ and $Q_2$. For a group-by 312 query $\gamma_{A2}(Q)$, $\Gamma(A_2)$ is interested with the groupwise columns of Q. For a union 314 $Q_1:::Q_2$, the query is groupwise on the intersection of the groupwise columns of $Q_1$ and $Q_2$.

Program synthesis is used to generate a UDO that is equivalent to a given query. Formally, given a query Q that operates over table input, where input is pre-partitioned on columns A, a set of sort-columns B and a function udo may be produced such that udo(sort(B, input)) is equivalent to Q(input). The use of column sets A and B is important for integrating the synthesis result within the synthesis engine.

This section outlines a template that defines a space of possible combinations of sorting columns B and implementation udo that the synthesis engine will search over. The template is presented in a programmatic fashion in Table 7 and referred to as a super_udo to denote the fact that it searches over the sorting columns and the udo at the same time. The template makes use of information extracted from the input query Q to keep the synthesis task manageable.

The template uses meta-operators repeat and choose that are directives to the synthesis engine: repeat(n){B} for a constant n is replaced by at most n instantiations of B; choose{S} is replaced by one of the expressions in the set S. In an example, the statements are evaluated from outermost to innermost. Accordingly, if a choose{S} statement is nested within a repeat(n){B} block, then first the block B is instantiated possibly multiple times, revealing multiple choose{S} statements, each of which may be resolved independently.

The template operates on a list of records (e.g., a table). The helper functions update and predicate are shown in Tables 8 and 9, respectively. In various examples, the template is structured so that any possible instantiation will run in linear time (modulo sorting) and require at most constant space in addition to storing the input and output tables. Each loop iterates over the input just once and loops are not nested.

The UDO template is chosen such that the template is at least able to synthesize SQL operators such as selection, projection, and group-by. To this end the template makes use of the following program constructs.

Let the set of aggregation functions used in the input query be f_i for 1≤i≤m. Let init(f) refer to the initial value of aggregation f. For example, init(sum) is 0, whereas init(min) is ∞. The template may use a single object called scope with a fixed number of fields: Boolean fields flag_i for 1≤i≤n (fixed constant n), integer or rational fields v_i for 1≤i≤m (one for each aggregation function used in the input query), a list sort_cols of column names that the UDO will sort, a record old_row for memoizing the previously processed row, a Boolean flag do_break used for breaking out of loops early, and a list res to store the output.

Table 7 shows an example of an UDO template. The template starts by initializing the scope object (lines 3-9). Next, the template assumes that the input is pre-partitioned on columns A (line 11) by assuming that all values in A are the same. In lines 13-17, the template chooses an arbitrary set of columns and sorts the input (lexicographically) on those columns. Lines 19-25 are optional loops for computing aggregations, predicates and expressions that require a single pass over all records. Lines 28-31 contain a mandatory loop that in addition to the above computes the output.

TABLE 7

```
1    List super_ udo (List input) {
2        // init flags, i in [1, n]
3        scope.flag_ i = false;
4        // init aggregation, i in [1, m]
5        scope.v_i = init ( );
6        // init sorting columns
7        scope.sort_ cols = nil;
8        // init output
9        scope.res = nil;
10       // input is pre - partitioned on columns A
11       assume all_ equal (input, A);
12       // choose sorting columns
13       if (choose { true, false }) {
14           repeat (p1) {
15               scope.sort_ cols.add (choose { cols (input)});
16           } input = sort (input, scope.sort_ cols);
17       }
18       // optional aggregation loops
19       if (choose { true, false }) {
20           repeat (p2) {
21               scope.do_ break = false;
22               foreach (row in input) {
23                   if (scope.do_ break) break;
24                   update (scope, row, false);
25       } } }
26       // aggregation and output loop
27       scope.do_ break = false;
28       foreach (row in input) {
29           if (scope.do_ break) break;
30           update (scope, row, true);
31       }
32       return scope.res;
33   }
```

The update template (Table 8) is a sequence of p3 guarded commands. A command updates fields of scope, such as setting flags, aggregating values, resetting them to their initial value, or adding a single record to the res field. Each command is guarded by a predicate synthesized in predicate (Table 9). In various experiments, the same predicate is often needed for multiple commands. Hence, the repeat(p4) block appears inside the predicate guard.

TABLE 8

```
void update (scope , row , can_ output) {
    repeat (p3) {
        if (predicate (scope, row)) {
            repeat (p4) {
                choose {
                    //set flags, i in [1, n]
                    scope.flag_ i = true,
                    // set break
                    scope.do_ break = true,
                    // reset aggregation, i in [1, m]
                    scope.v_i = init (f_i),
                    // aggregate, column a, i in [1, m]
                    scope.v_i =f_i(scope.v_i, row.a),
                    // memoize current row
                    scope.old_ row = row,
                    if (can_ output) {
                        //  add    to    output
                        scope.res.add (cat (row, scope.v_1, ...,
                        scope.v_m))
                    }
                };
    } } } }
```

TABLE 9

```
bool predicate (scope, row) {
    p = choose { true, false };
    repeat (p5) {
        t = choose {
            // check query predicate φ in Q
            normalize (φ, scope, row),
            // check flags, i in [1, n]
            scope.flag_ i == true,
            // check partition boundary, a in scope.sort_ cols
            scope.old_ row.a == row .a,
            // check if last row
            is_ last (row), true
        };
        t = choose {!t, t};
        p = choose {p && t, p || t};
    }
    return p;
}
```

The predicate template searches over possible predicates consisting of p5 terms, where each term may check a flag, check a predicate that appeared in the input query, compare the old_row against the current, check if the current row is the last in the table, or just be the constant true. A term may optionally be negated (!) and then conjoined using either conjunction (&&) or disjunction (||).

Predicates that are extracted from the input query may be normalized because they might refer to columns of intermediate tables, whereas the UDO operates on the input table. The synthesis engine, therefore, may undo renamings and replace column names with ones appearing in row. Aggregation functions may also be replaced by intermediate results in the scope object. For example, consider the query in Table 1. The predicate m1>100 may be extracted from the query. To use this predicate it may be normalized to scope.v_i≤100, where v_i is being used for a sum aggregation.

A group-by operator may be synthesized by first sorting over its partitioning columns, then iterating over this sorted order and using the field old_row to remember the previous row. When old_row differs from row on the sort columns, the UDO knows that the partition has changed; and the synthesis engine may reset any aggregated value and start aggregating the next partition. Of course, the UDO may do much more, for example, output multiple rows per group (unlike a group-by that outputs a single row per group) or replace the complex self-join of Table 1 with iteration and flags (Table 2).

Figure 4:
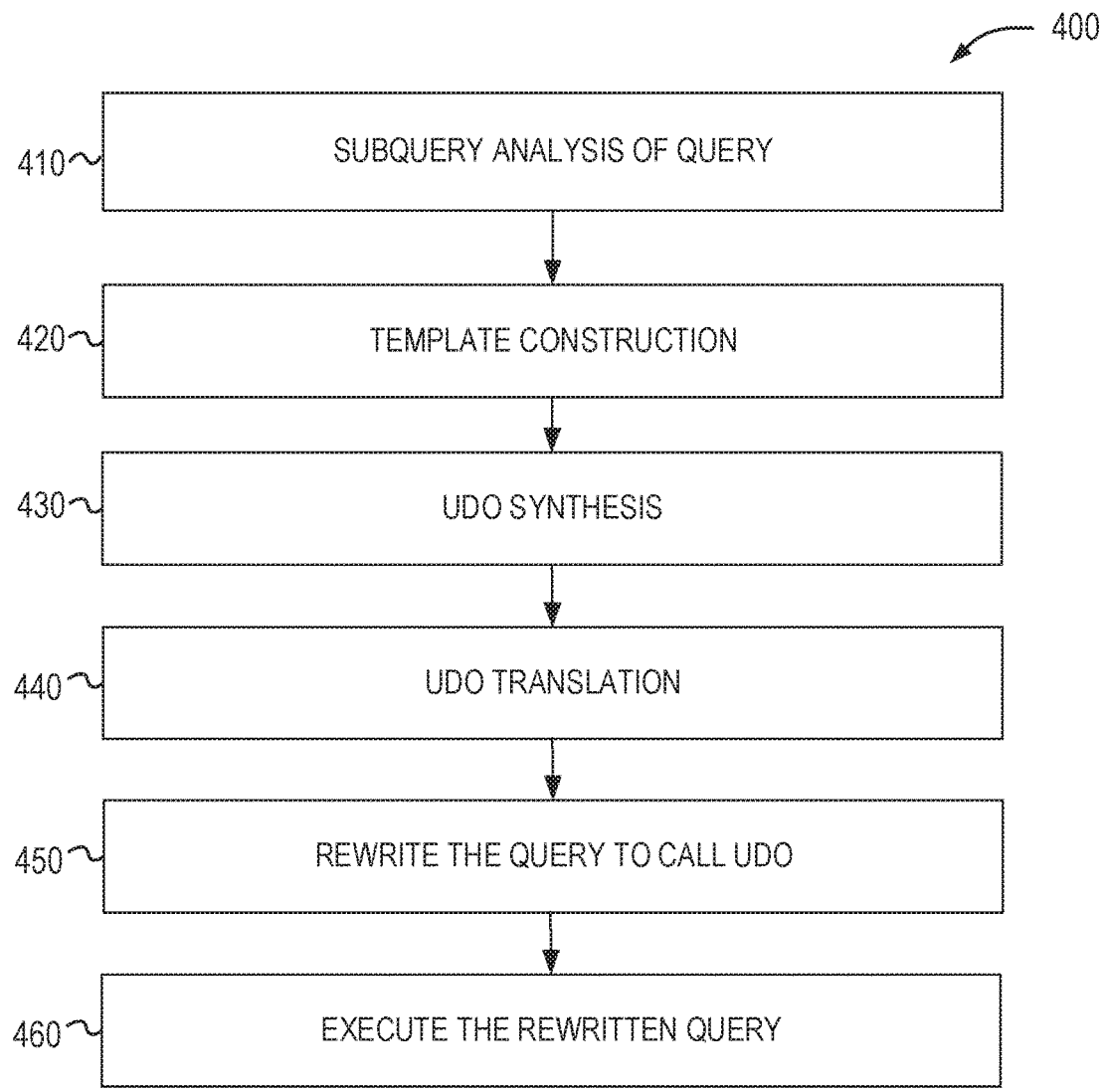
FIG. 4 illustrates a query-to-query transformation in accordance with respective examples.

FIG. 4 illustrates a query-to-query transformation process 400 in accordance with respective examples. In an example, the process 400 takes a SQL query as input, synthesizes a UDO for all or part of the original SQL query. The UDO synthesizes may use a framework such as Sketch.

The first stage 410 identifies sub-queries of the input query that are candidates for optimization. This may be done by examining the input query Q in its view form as a sequence of assignments and constructing the query DAG. Nodes in the DAG correspond to variables and edges correspond to operators. For instance, an assignment $v_j$=op $(v_j, v_k)$ results in the edges $(v_j, v_i)$ and $(v_k, v_i)$ getting added to the query DAG. In this DAG, for each node n that is not the result of a select, project or a rename operator, a groupwise analysis that starts at n and is limited to only nodes dominated by n may be performed. Once this process finishes, the largest sub-queries (greedily) that are groupwise on at least one column may be selected. This process is quadratic time in the number of union, join and group-by operators in the query but is efficient in practice. As example, let $Q_{cand}$ be one such sub-query. The subsequent stages of the process 400 are repeated for each such $Q_{cand}$.

The second stage 420 constructs the input to the synthesis tool which may be a synthesis template udo. In an example, the synthesis engine may use a program synthesis tool called Sketch. Sketch accepts a program written in an imperative-style language (also referred to as a sketch). This program may contain assertions, repeat meta statements and may contain holes, which are used in if-else cascades to encode choices between expressions and statements, much like the template described above. The goal of the program synthesis tool is to resolve all choices such that the resulting program satisfies all its assertions.

It is important to note that some program synthesis tools may only provide guarantees of correctness under a bound on the size of the input (e.g., the size of the input table). A synthesized program may be manually verified for correctness. This limitation has a bearing on the treatment of complex predicates. For instance, a predicate x≥5000, where x is a count on the number of rows in a table will only be satisfied by tables with at least 5000 rows. The synthesizer may not be able to satisfy this predicate (e.g., the synthesizer may operate only on small input tables) and, therefore, will not lean anything about subsequent parts of the query. To overcome this, the process 400 may replace large constants with smaller ones, perform the synthesis, and then replace back the original values. This is possible because the UDO template borrows predicates directly from the original query (e.g., Table 9). In this example, the process 400 remembers the origin of each predicate in the template as well as the synthesized UDO.

At 430, $Q_{cand}$ is synthesized into a program without holes. For example, $Q_{cand}$ may be translated into a sketch program without holes. This may be done via a compilation of relational operators to imperative code that implements the operators. Next, $Q_{cand}$ is used to generate a sketch based on the template described in the previous section and from 420. These two synthesized programs, e.g., sketches, may be put together using a harness. The harness calls the synthesize programs one after the other to obtain their outputs (e.g., spec_out and udo_out) and asserts they are equivalent. Table 10 shows an example of such a harness:

TABLE 10

```
assert size (spec_out) == size (udo_ out);
foreach (srow in spec_out) {
    bool matches = false;
    foreach (urow in udo_out)
        matches = matches || (srow == urow);
    assert matches;
}
```

Program synthesis using the template helps reduce the search space for generating programs. A multitude of options are used to heuristically configure the template which helps in scaling the synthesis task. For example, the constants $p_1, \ldots, p_5$ that control the repeat blocks in the template may be fixed (Tables 7, 8 and 9). In addition, a parameter, e.g., $p_6$, may be used to decide whether to split the query predicates φ into their sub-terms when constructing the template. In an example, three configurations were used $(p_1, p_2, p_3, p_4, p_5, p_6)=\{(1, 1, 3, 2, 3, F), (2, 1, 5, 1, 3, F), (2, 1, 5, 2, 4, T)\}$. The number of Boolean flags (flag_i) was fixed at two in this example. Three program synthesizer instances—one for each configuration—in parallel were spawned and the solution of the fastest instance was selected. Typically, the fastest solution came from a run with smaller parameters, resulting in a simpler UDO. The program synthesizer may output the UDO in one language that needs to be translated to another language at 440. For example, Sketch outputs, by default, a C++ program when the synthesis succeeds. The C++ program may be translated to the synthesis engine language. For example, the UDO implementation and the sorting columns may be extracted by inspecting the C++ program and translating it to the synthesis engine language expected by the big-data platform that the original query was targeting. The original query may then be rewritten to call the translated UDO implementation at 450. Once rewritten, the rewritten query may be executed at 460. The rewritten query is equivalent to the original query, but calls the synthesized UDO for some or all of the operations of the original query. As explained in greater detail below, the rewritten query may include multiple calls to UDOs, with each UDO implementing part of the original query.

The synthesis engine may be scaled by reducing the original query into smaller sub-queries. A query analysis may be used to split a query into smaller queries to deal with N-ary unions and joins, perform taint analysis to simplify the UDO template, and identify redundant columns that can be eliminated altogether from the query.

Operators like join and union combine multiple data inputs. When done in succession to combine more than two data sources, e.g., $Q_1 \bowtie Q_2 \bowtie Q_3$, we refer to them as N-ary operators. N-way joins and unions may be identified within a query. The query may be split into N+1 queries; the first N each compute one of the inputs to the N-ary operator, and the last one actually runs the operator. For example, the query in Table 3 may be broken into six queries: one each to compute tables Out1 to Out5 and the last one that does a union of these five tables. Each smaller query is simpler to optimize compared to the original query. The synthesized UDOs may then be put together in a way that is efficient (with linear complexity) while preserving semantics.

Consider a query Q that is either a join or a union of N sub-queries $Q_1$ to $Q_N$. In an example, to optimize this query, Q is groupwise. Let A be the groupwise columns of Q. Going by FIG. 3, the queries $Q_i$ are also groupwise on A (although they may be groupwise on more columns). The program synthesizer may be invoked on each sub-query $Q_i$ while enforcing A as the groupwise columns. If program synthesis fails then optimizing the query Q may be aborted. The program synthesis engine may obtain the pair ($udo_i$, $s_i$) of the UDO and sorting order for $Q_i$. The program synthesis engine may check if each $s_i$ is a prefix of a common list s. If this holds, then s will be the sorting order of the composed UDO. Next, the program synthesis engine determines if the UDOs may be fused into a single linear-complexity UDO.

In the case of union, fusion is possible. For a union, the individual UDOs may be called one after the other on different scope objects, except that they use the same res field for output. A more efficient way is to fuse the update loops of the individual UDOs into one loop and fuse the output loops into a single loop as well. FIG. 5A shows the merged UDO that combines UDOs of Out1 and Out2 of Query2 of Table 3. The highlighted portions 502 and 504 indicate parts of the individual UDOs.

For a join, fusion may not always be possible. However, groupwise queries provide an opportunity for linear implementations of (equi-)joins. Note that if the input query Q is groupwise on A, then by the Join rule of FIG. 3, the N-ary join must be an equi-join on columns A. If each of the N UDOs produce a single output per partition on A then the UDOs may be combine them into a single linear-time UDO.

This condition may be checked by the synthesis engine. For example, the query from Table 1 does not satisfy this requirement. If the condition is satisfied, the UDOs are fused together, just like for union, but instead of adding rows to the res field, the UDO concatenates rows together to simulate the join operation. This is illustrated in FIG. 5B, which shows the merged UDO of a join with highlighted portions 512 and 514 indicating parts of individual UDOs in accordance with respective examples.

The synthesis engine may not perform synthesis first and then later check if the resulting UDOs and sorting orders may be put together. Instead, the synthesis engine adds additional constraints to the synthesis tasks so that if each of the N synthesis tasks succeed then the composition is possible. For example, for the sorting order, the program synthesis engine first chooses a single sorting order s, then enforces that each synthesis task only consider prefixes of s. Further, in the case of N-ary joins, the synthesis engine restricts the UDO templates to produce output just once.

The program synthesis engine may also include a query taint analysis to determine which columns of the input table of a query influences what columns in the query's output. Taint relationships may be used in various ways. For example, the query analysis may eliminate input columns that do not taint any of the output columns. For example, in Table 3, columns m2 to m6 do not influence any of the columns of the Out1 table. The columns m2 to m6 may be deleted from the sub-query such that the columns m2 to m6 are eliminated from the UDO template. Second, the taint analysis may identify flow-through columns. A flow-through column is a column that are input columns that do not influence any other column, i.e., they simply flow to the output unmodified. The sales column of Table 1 is one such example. Flow-through columns may be excluded for consideration in the UDO template in all places, except when output is added to scope.res. That is, they need not be considered for sorting, or in a predicate or aggregation since they are used only for output.

Figure 6:
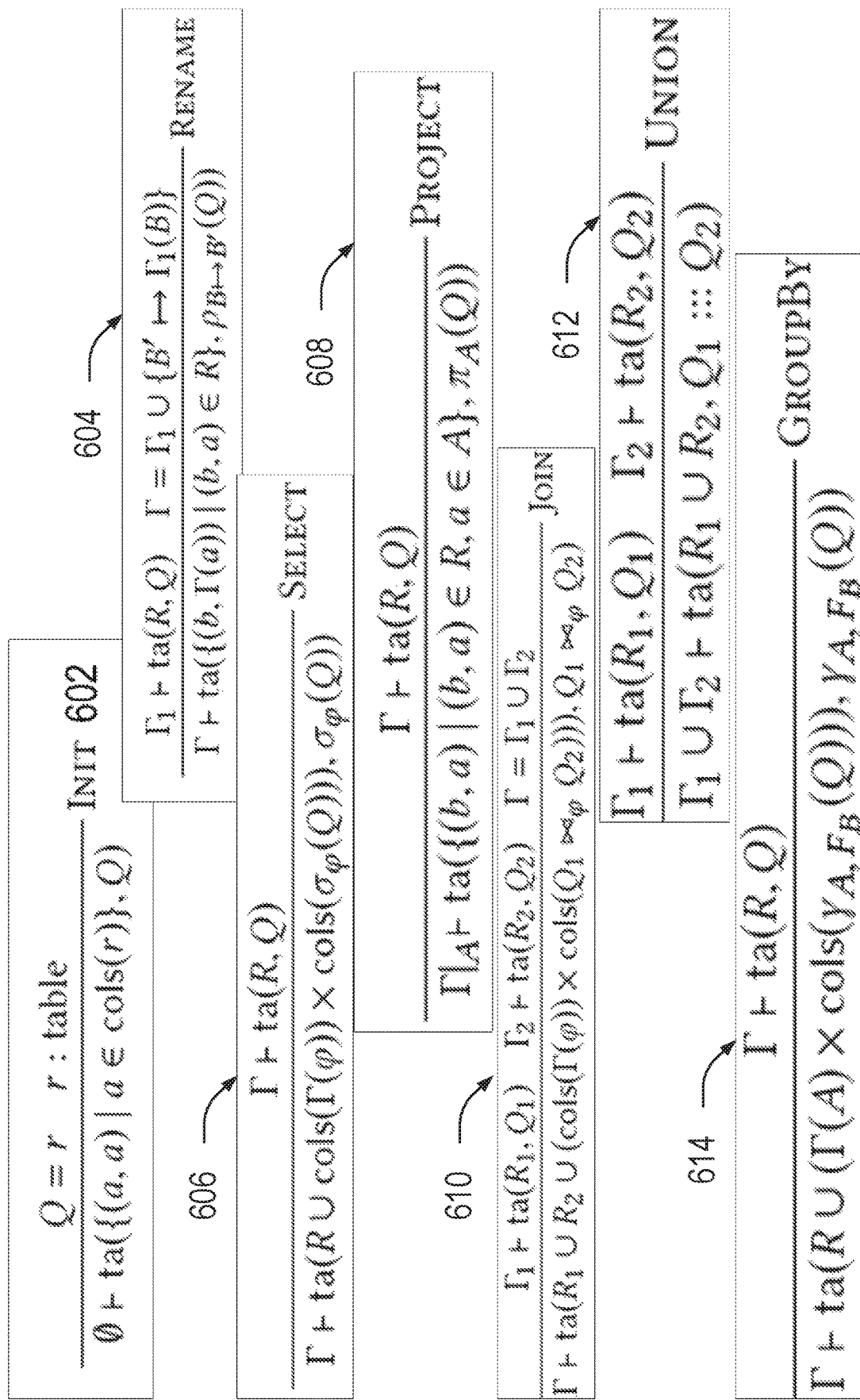
FIG. 6 formally presents a taint analysis in accordance with respective examples.

FIG. 6 formally presents a taint analysis in accordance with respective examples. A judgement $\Gamma \vdash ta(R, Q)$ means that the query Q carries the taint relationship R, where R is a binary relation from input columns to output columns. In other words, if $(a, b) \in R$ then input column a potentially influences output column b. As in the groupwise analysis, $\Gamma$ is used to designate to carry column renaming information.

The taint analysis starts with the identity relationship (rule Init 602) for the empty query. The rules for renaming 604 and projection 608 are straightforward. Whenever the analysis encounters a predicate (in Select 606 or Join 610), the taint analysis adds a taint from all columns that appear in the predicate to all output columns. For a group-by 614, the taint analysis adds a taint from all partitioning columns to all output columns.

The synthesis engine may also do a redundant column analysis. A set of columns is considered to be redundant if the columns always occur together in the partitioning columns of a group-by or an equi-join operator and never in a filtering predicate. Essentially, redundant columns are treated in a similar manner by the query. The redundant columns may be replaced by a single column, which carries a tuple of values of the redundant columns. In an example, all columns but one from a redundant set of columns may be dropped. This offers reduction in the complexity of the UDO template. Once the UDO is synthesized, the redundant columns may be reintroduced. For Out1 in Table 3, {a,b} form a redundant column set. In Table 4, column b has been dropped for the synthesis of the UDO and may be added back after the UDO after the synthesis task is completed.

Figure 7:
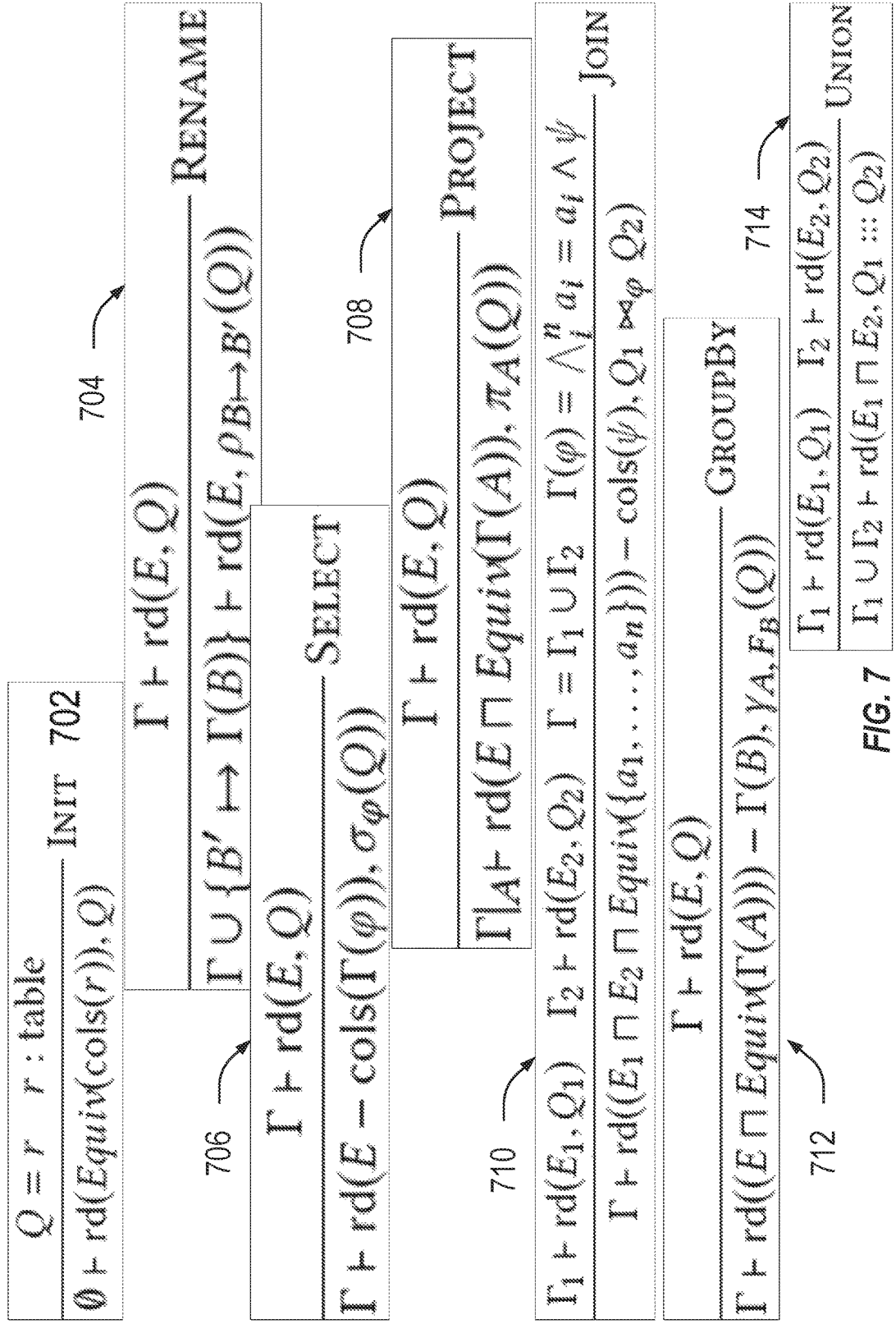
FIG. 7 presents a redundant column analysis in accordance with respective examples.

FIG. 7 presents a redundant column analysis in accordance with respective examples. The judgement $\Gamma \vdash rd(E, Q)$ defines an equivalence relation E over the set of input columns of Q. The equivalence classes of E define all redundant column sets of the query. For a set A of columns, Equiv(A) is the equivalence class where $(a, b) \in$ Equiv(A) if and only if $a \in A$ and $b \in A$. For two equivalence relations $E_1$ and $E_2$, $E_1 \sqcap E_2 \cup_{Equiv(Ai) \in E1, Equiv(Bj) \in E2} \{Equiv(A_i \cap B_j),$ Equiv($A_i$-cols($E_2$)), Equiv($B_j$-cols($E_1$))$\}$ is their partition. Finally, E–A is the same as the equivalence E except that columns in A are removed from all equivalence classes, i.e., $E-A=\cup_{Equiv(B) \in E}$ Equiv(B–A).

For example, consider the following query. The query operates on a table r with columns $\{a, \ldots, e\}$.

$v_1 = \sigma_e > 0(\gamma\{a,b,c,d\}, sum(e)(r))$
$v_2 = \rho\{a,b,e\} \to \{a',b',e'\}(\gamma\{a,b\}, sum(e)(v_1))$
$v_3 = v1 \bowtie a=a' \wedge b=b' v2$ The analysis of FIG. 7 outputs columns a and b are equivalent, and so are columns c and d. Thus, columns b and d may be dropped and the resulting query will be the following, which operates on a table r with columns $\{a, c, e\}$:

$v_1 = \sigma_e > 0(\gamma\{a,c\}, sum(e)(r))$
$v_2 = \rho\{a,e\} \to \{a',e'\}(\gamma\{a\}, sum(e)(v_1))$
$v_3 = v1 \bowtie a=a' v2$ In an example, the synthesis engine was evaluated over a set of production queries from a real-world data storage cluster. The evaluation used two query engines: Spark and Scope.

To generate benchmark queries, logs from the data storage cluster were analyzed. The log included query scripts, their query plans as generated by Scope and execution time statistics. The log contained about 90,000 queries that cumulatively took nearly 790,000 minutes to execute. Many of the queries executed repeatedly and some of them were short running (<30 minutes). From the 90,000 queries 1,100 unique long-running jobs were identified. These long-running jobs cumulatively accounted for 80% of the total execution time. Among these long-running jobs, 375 queries (34%) were found to have at least one stage that dominated three or more stages. Nineteen suitable queries were selected as the benchmark queries. The input data to the benchmark queries used data from TPCDS, a standard database benchmark suite.

FIG. 8 shows benchmark queries along with a number of stages 802A and 802B, sub-queries 804A and 804B, and operators 806 in accordance with respective examples. The table contains statistics about the query plans generated by both Scope and Spark. The number of stages 802A and 802B in the plan and how many of them were included in a sub-query 804A and 804B picked by the synthesis engine for optimization are also shown in the table. As the table shows, a significant fraction (sometimes all) of the stages were marked for optimization. Finally, the table reports the number of group-by, join and union operators in the sub-query 806. The sub-queries were quite complex, some had more than 5 joins or unions. As seen below, the synthesis engine scaled to them and synthesized UDOs that were more efficient compared to Spark and Scope optimized queries.

The optimized queries returned by the synthesis engine were ran on both Spark and Scope on two separate clusters. One was a production cluster running Scope and the other was a 16-node standalone Spark (ver. 2.0.2) cluster running on Azure (D4 v2 VMs). The production cluster had a little more than 50,000 nodes and our jobs were restricted to use at-most 1,000 tokens. The synthesis engine was run on a standard desktop machine.

FIG. 10 shows results from running the synthesis engine over various example queries in accordance with respective examples. For this analysis, the synthesis engine was executed with a time limit of 10 minutes. The synthesis succeeded in 14 cases within one minute 1002. Table 1000 shows which analyses were useful (column "simplifying analysis" 1004) for each query. In this column, s means query splitting was done; t taint analysis was used; and r redundancy analysis was used. In particular, query splitting lead to significant gains. Thirteen queries used query splitting and simplified all N-ary queries with N>2. Without this simplification, none of the queries with N>2 would synthesize within the 10-minute time limit. Redundant column analysis applied to fewer queries but sped up synthesis significantly for these queries. Four of the five queries would time-out without this analysis. The rest of the columns in the table 1000 show characteristics of the synthesized UDO: time complexity 1006, space complexity 1008, number of sorting columns 1010, and the lines of code 1012. A majority of the UDOs have constant space complexity, i.e., they only require a single pass over the input rows, thus, may be executed in a streaming fashion.

Figure 9:
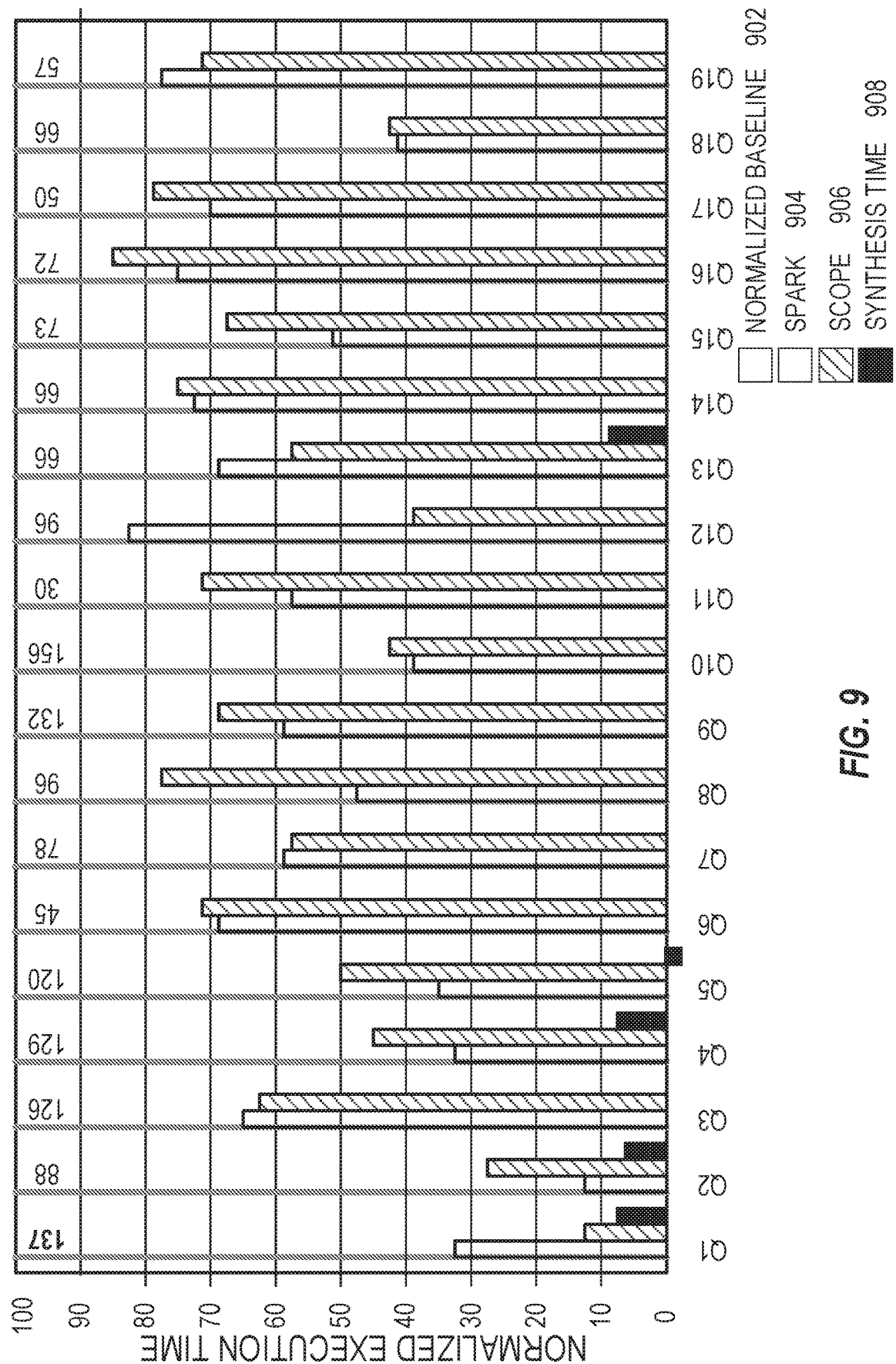
FIG. 9 illustrates performance comparisons in accordance with respective examples.

FIG. 9 illustrates performance comparisons in accordance with respective examples. FIG. 900 compares the normalized execution time on each of the systems. Each benchmark has four bars 902, 904, 906, and 908. The first bar 902 is the baseline unoptimized query running time normalized to 100%. For reference, this bar is labelled with the actual execution time in minutes on Scope. The second bar 904 shows the percentage of time needed to run the query when optimized by the synthesis engine on Spark (compared to the baseline execution on Spark). The third bar 906 shows the same for Scope and the last bar 908 is the synthesis time. Queries from the synthesis engine performed consistently better on both systems. They run 1.3×-4.7× faster with a mean speedup of 1.92× on Scope and 2× on Spark.

The performance improvements were influenced by two factors: the number of stages eliminated and the complexity of the synthesized UDO. Queries Q1, Q2, Q4, Q5, Q10 all used streaming UDOs (linear time, constant space) with 6 or more stages eliminated, leading to 2.5× or more performance improvement. Queries Q3, Q13, Q17 used linear time UDOs, and Q16, Q19 had a small number of stages eliminated. These queries still speed up in the range 1.3×-2×. Q15 was very similar to Q16, but the UDO filtered out a significant amount of data, which saved on computing large intermediate data. This lead to bigger gains.

Figure 11:
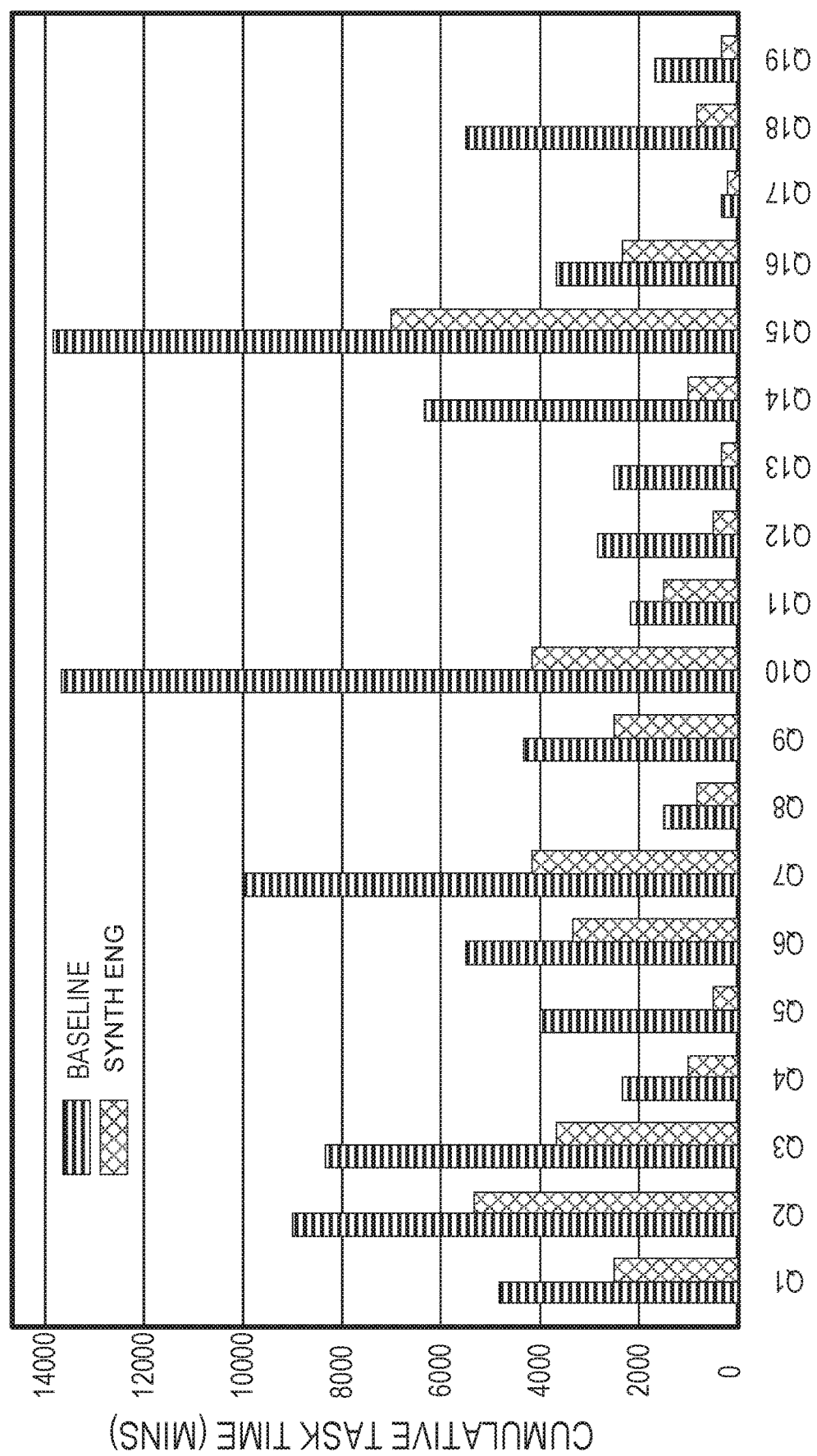
FIG. 11 illustrates time spent executing the benchmark queries in accordance with respective examples.
Figure 12:
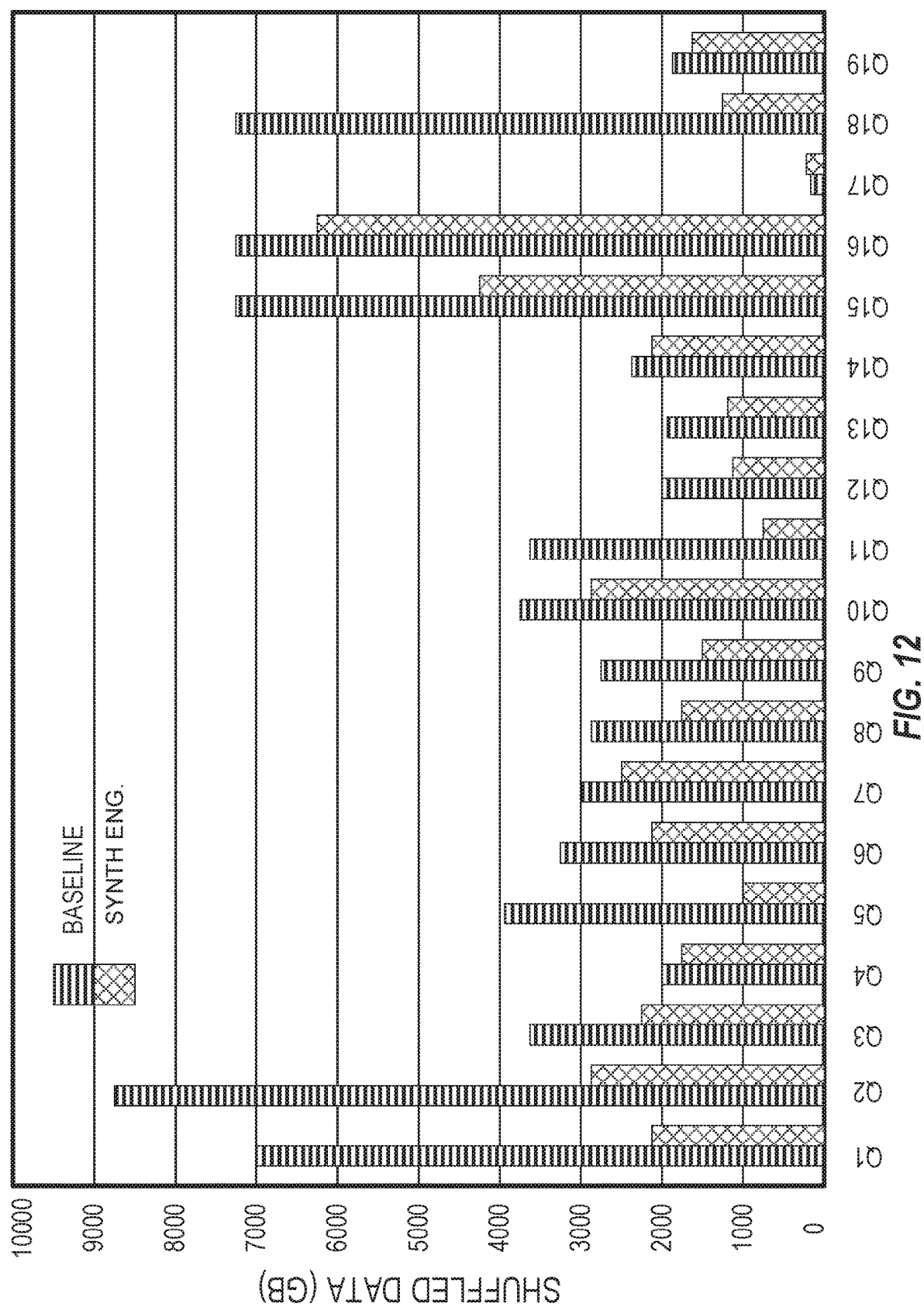
FIG. 12 illustrates data transfers when executing the benchmark queries in accordance with respective examples.

In addition to reducing execution time, the synthesis engine also reduced the resource requirements of the queries. FIG. 11 illustrates time spent executing the benchmark queries in accordance with respective examples. FIG. 12 illustrates data transfers when executing the benchmark queries in accordance with respective examples. Note that unlike the execution time, which is sensitive to the number of concurrent containers or VMs that the cluster can support, these metrics are a more robust measure of the quality of an execution plan. The synthesis engine brought down the resource consumption drastically. The optimized queries saved more than 50% of cumulative CPU time for all but one query, with a peak saving of close to 90%. The synthesis engine also reduced the amount of data transfers by up to 75%.

Figure 13:
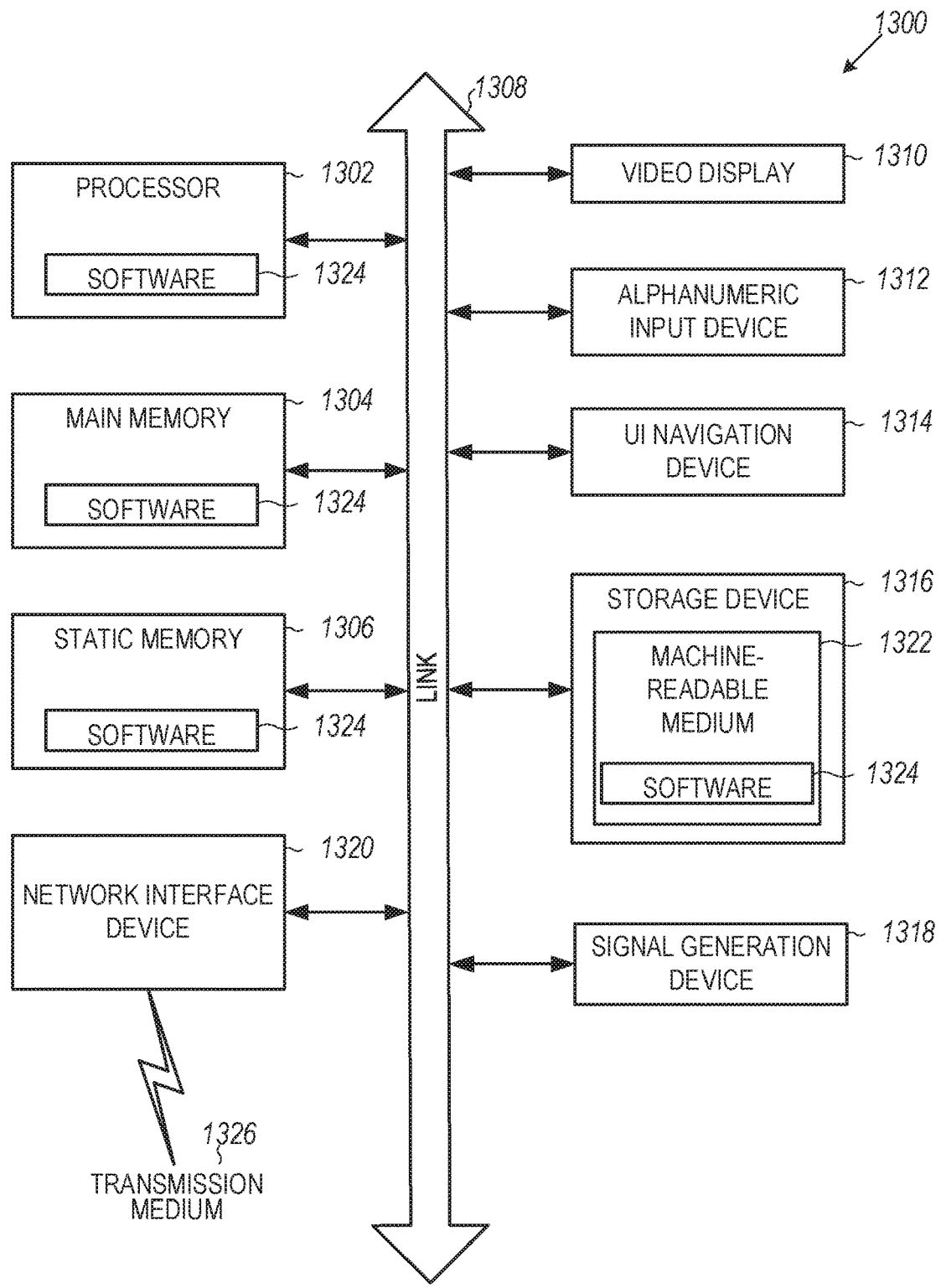
FIG. 13 is an example computing device that can be used in conjunction with the technologies described herein.

FIG. 13 is an example computing device that can be used in conjunction with the technologies described herein. In alternative embodiments, the computing device 1300 may operate as a standalone device or may be connected (e.g., networked) to other computing devices. In a networked deployment, the computing device 1300 may operate in the capacity of a server communication device, a client communication device, or both in server-client network environments. In an example, the computing device 1300 may act as a peer computing device in peer-to-peer (P2P) (or other distributed) network environment. The computing device 1300 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. Computing device may be an implementation of device that the synthesis engine runs on and may perform the method of FIG. 4.

Computing device 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via a link (e.g., bus) 1308. The computing device 1300 may further include a display unit 1310, an input device 1312 (e.g., a keyboard), and a user interface (UI) navigation device 1314 (e.g., a mouse). In an example, the display unit 1310, input device 1312, and UI navigation device 1314 may be a touch screen display. In an example, the input device 1312 may include a touchscreen, a microphone, a camera (e.g., a panoramic or high-resolution camera), physical keyboard, trackball, or other input devices.

The computing device 1300 may additionally include a storage device (e.g., drive unit) 1316, a signal generation device 1318 (e.g., a speaker, a projection device, or any other type of information output device), a network interface device 1320, and one or more sensors 1321, such as a global positioning system (GPS) sensor, compass, accelerometer, motion detector, or other sensor. The computing device 1300 may include an input/output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 1316 may include a computing-readable (or machine-readable) storage media 1322, on which is stored one or more sets of data structures or instructions 1324 (e.g., software) embodying or utilized by any one or more of the techniques or functions described herein. In an example, at least a portion of the software may include an operating system and/or one or more applications (or apps) implementing one or more of the functionalities described herein. The instructions 1324 may also reside, completely or at least partially, within the main memory 1304, within the static memory 1306, and/or within the hardware processor 1302 during execution thereof by the computing device 1300. In an example, one or any combination of the hardware processor 1302, the main memory 1304, the static memory 1306, or the storage device 1316 may constitute computing device (or machine) readable media.

While the computer-readable storage media 1322 is illustrated as a single medium, a "computer-readable storage media" or "machine-readable storage media" may include a single medium or multiple media (e.g., a centralized or distributed database, and/or associated caches and servers) configured to store the one or more instructions 1324.

In an example, a computer-readable storage media or machine-readable storage media may include any medium that is capable of storing, encoding, or carrying instructions for execution by the computing device 1300 and that cause the computing device 1300 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.13 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 1320 may use the transfer protocols to transmit data using transitory propagating signals.

In an example, the network interface device 1320 may include one or more physical jacks (e.g., Ethernet, coaxial, or phone jacks) or one or more antennas to connect to the communications network 1326. In an example, the network interface device 1320 may include one or more wireless modems, such as a Bluetooth modem, a Wi-Fi modem or one or more modems or transceivers operating under any of the communication standards mentioned herein. In an example, the network interface device 1320 may include a plurality of antennas to wirelessly communicate using at least one of single-input multiple-output (SIMO), multiple-input multiple-output (MIMO), or multiple-input single-output (MISO) techniques. In some examples, the network interface device 1320 may wirelessly communicate using Multiple User MIMO techniques. In an example, a transmission medium may include any intangible medium that is capable of storing, encoding or carrying instructions for execution by the computing device 1300, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method for program synthesis of a database query, the method comprising operations performed using an electronic processor, the operations comprising:
   analyzing a database query provided in a first language to identify a first sub-query;
   constructing a first synthesis template for the first sub-query;
   synthesizing a first program using the first synthesis template, wherein the first program is synthesized in a second language different from the first language, and wherein functionality of the first program is equivalent to the first sub-query;
   identifying a second sub-query, wherein the first sub-query and the second sub-query are groupwise on a common column;
   constructing a second synthesis template for the second sub-query;
   synthesizing a second program, in the second language, using the second synthesis template, wherein the second program is functionally equivalent to the second sub-query;
   rewriting the database query by combining results from the first program and the second program and wherein the first and second synthesis templates comprise respective partial programs with code holes to reduce program synthesis search space; and
   executing the rewritten database query.

2. The method of claim 1, further comprising:
   determining the first sub-query and the second sub-query operate on a same set of rows; and
   combining the first program and the second program into a single program.

3. The method of claim 1, wherein the first program and the second program effectuate a join in the database query.

4. The method of claim 1, wherein the first program and the second program effectuate a union in the database query.

5. The method of claim 1, further comprising sorting input rows prior to calling the first program, wherein the input rows are input for the first program.

6. The method of claim 1, further comprising:
identifying columns in the first sub-query that do not influence the output of the first sub-query; and
removing the identified columns from the first sub-query and first synthesis template prior to synthesizing the first program.

7. The method of claim 1, further comprising:
identifying a first column and a second column in the first sub-query that occur together throughout the first sub-query; and
combining the first column and the second column in the first sub-query with a single column prior to synthesizing the first program.

8. The method of claim 1, wherein the first language is a structured query language.

9. The method of claim 1, wherein executing the rewritten database query comprises sending the database query to a database.

10. A system for program synthesis of a database query, the system comprising one or more electronic processors to:
analyze a database query provided in a first language to identify a first sub-query;
construct a first synthesis template for the first sub-query;
synthesize a first program using the first synthesis template, wherein the first program is synthesized in a second language different from the first language, and wherein functionality of the first program is equivalent to the first sub-query;
identify a second sub-query, wherein the first sub-query and the second sub-query are groupwise on a common column;
construct a second synthesis template for the second sub-query;
synthesize a second program, in the second language, using the second synthesis template, wherein the second program is functionally equivalent to the second sub-query;
rewrite the database query by combining results from the first program and the second program and wherein the first and second synthesis templates comprise respective partial programs with code holes to reduce program synthesis search space; and
execute the rewritten database query.

11. The system of claim 10, wherein the one or more electronic processors are further configured to:
determine the first sub-query and the second sub-query operate on a same set of rows; and
combine the first program and the second program into a single program.

12. The system of claim 10, wherein the one or more electronic processors are further configured to sort input rows prior to calling the first program, wherein the input rows are input for the first program.

13. The system of claim 10, wherein the one or more electronic processors are further configured to:
identify columns in the first sub-query that do not influence the output of the first sub-query; and
remove the identified columns from the first sub-query prior to synthesizing the first program.

14. A computer-readable storage media storing computer-executable instructions for program synthesis of a database query, the stored instructions comprising:
instructions to analyze a database query provided in a first language to identify a first sub-query;
instructions to construct a first synthesis template for the first sub-query;
instructions to synthesize a first program using the first synthesis template, wherein the first program is synthesized in a second language different from the first language, and wherein functionality of the first program is equivalent to the first sub-query;
instructions to identify a second sub-query, wherein the first sub-query and the second sub-query are groupwise on a common column;
instructions to construct a second synthesis template for the second sub-query;
instructions to synthesize a second program, in the second language, using the second synthesis template, wherein the second program is functionally equivalent to the second sub-query;
instructions to rewrite the database query by combining results from the first program and the second program and wherein the first and second synthesis templates comprise respective partial programs with code holes to reduce program synthesis search space; and
instructions to execute the rewritten database query.

15. The computer-readable storage media of claim 14, wherein the stored instructions further comprise:
instructions to determine the first sub-query and the second sub-query operate on a same set of rows; and
instructions to combine the first program and the second program into a single program.

* * * * *